June 16, 1953  C. S. BARRETT  2,642,223
AVERAGE COMPUTER

Filed July 5, 1951  2 Sheets-Sheet 1

INVENTOR
C. S. BARRETT
BY [signature]
ATTORNEY

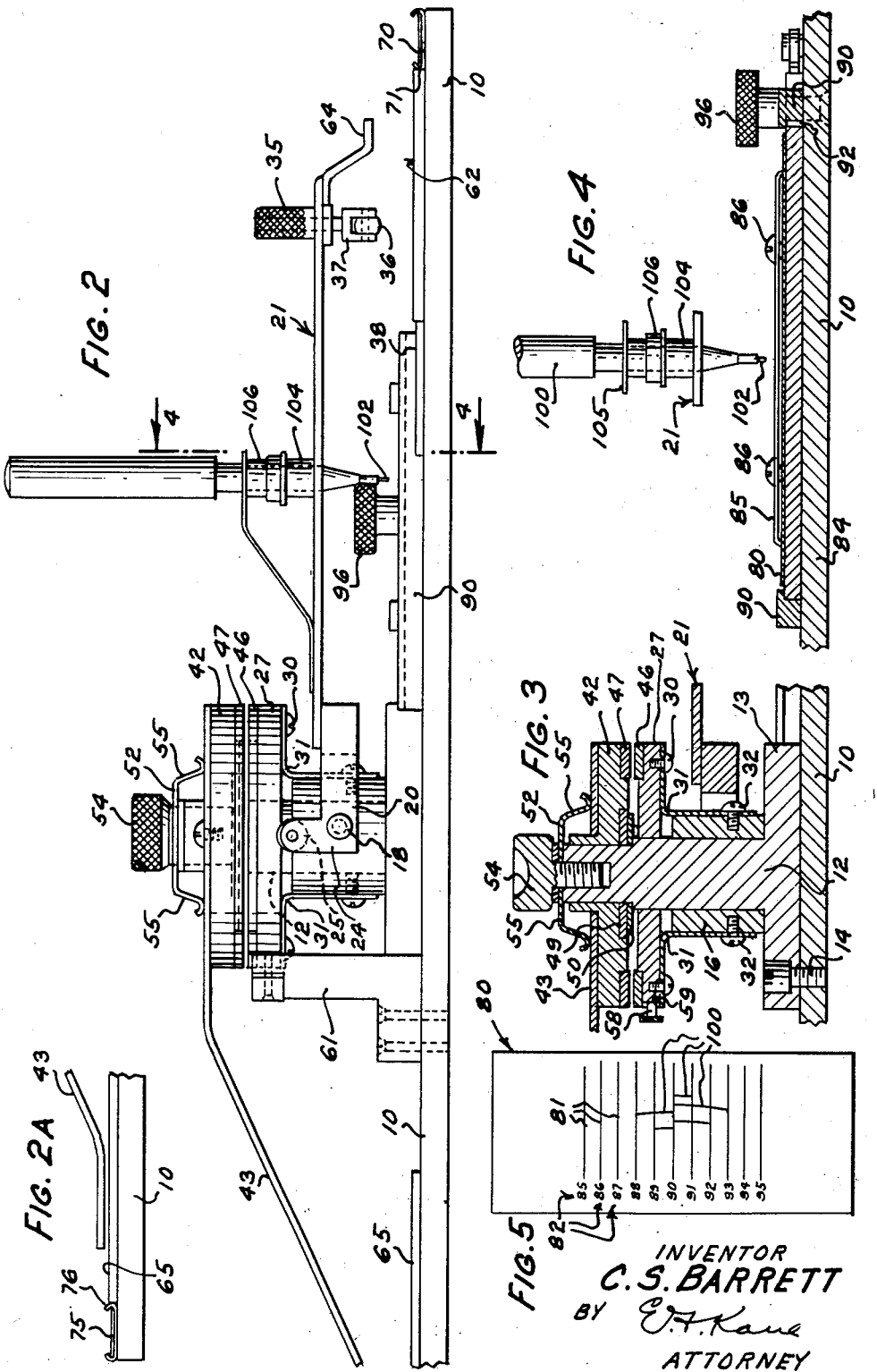

Patented June 16, 1953

2,642,223

UNITED STATES PATENT OFFICE 2,642,223

AVERAGE COMPUTER

Claudius S. Barrett, Palos Park, Ill., assignor to Western Electric Company, Incorporated, New York, N. Y., a corporation of New York Application July 5, 1951, Serial No. 235,230

9 Claims. (Cl. 235—61)

The present invention relates to a device for determining the average of a series of numerical values and more particularly to a device for mechanically computing the average and indicating the range values of a series of numbers or groups of observations or other data capable of being reduced to numbers.

In the manufacture of articles it is very often the practice to make periodic series of observations, measurements, or tests which can be reduced to numerical values and indicated by numbers, and then compute the average of the series of numbers for a variety of purposes such as to indicate any deviation from a norm. Usually the average of the series of numbers is obtained by writing the numbers on a sheet of paper, adding up the series, and dividing by the number of components in the series. This method of determining the average of the series of numbers is objectionable for various reasons, among which are that it is time consuming and relatively inefficient, requires the provision of materials for making the notations and computations, and involves the possibility of error in the computation.

It is an object of the present invention to provide a device for determining the average of a series of numerical values in response to the entering of said series of values into the device.

It is a further object of the invention to provide a device for determining the average of a series of numerical values in response to the entering of said series of values into the device and graphically indicating the number and the magnitude of the individual numerical values.

In accordance with one embodiment of the invention the numbers are entered into the device through a lever horizontally oscillatable on a post through various distances to selected points indicating the desired numbers on a scale associated with the free end of the lever. A pointer which is also oscillatable on the post and which cooperates with a scale on the device to indicate the average of the series of numbers is connected to the lever for oscillatory movement therewith when the lever is depressed from its normal elevation so that an operator may enter a number by first depressing the lever to establish a driving connection with the pointer and then oscillating the lever in either direction from a zero (0) position to the selected number on the scale and cause the pointer to be moved a corresponding arcuate distance in the opposite direction after which the lever is raised to its normal elevation to disconnect the pointer and the lever returned to its "0" position, leaving the pointer in its last set position. On completion of successive manipulations of the lever entering all of the numbers of the series the pointer will indicate the average of the series of the numbers on the second scale, which, together with the first scale may be calibrated for a specific range and series of numerical values. A card with a chart thereon is mounted on a carrier beneath the lever and is movable to a new position after the entering of successive numbers and a pen mounted on the lever is adapted to engage the chart and draw lines thereon as the lever is depressed and oscillated to indicate the number and magnitude of the individual numbers of the series entered into the device.

Other objects and advantages of the invention will become apparent by reference to the following detailed description thereof when considered in conjunction with the accompanying drawings illustrating a preferred embodiment of the invention, in which:

Fig. 1 is a plan view of the device showing the lever and the pointer in their normal or "0" positions;

Figs. 2 and 2A together show a side elevation of the device;

Fig. 3 is a vertical longitudinal sectional view of a portion of the device taken on the line 3—3 of Fig. 1;

Fig. 4 is a vertical, cross-sectional view taken on the line 4—4 of Fig. 2; and

Fig. 5 is a view of the chart card showing the graphical representation of a series of numbers entered in the device.

Figure 1:
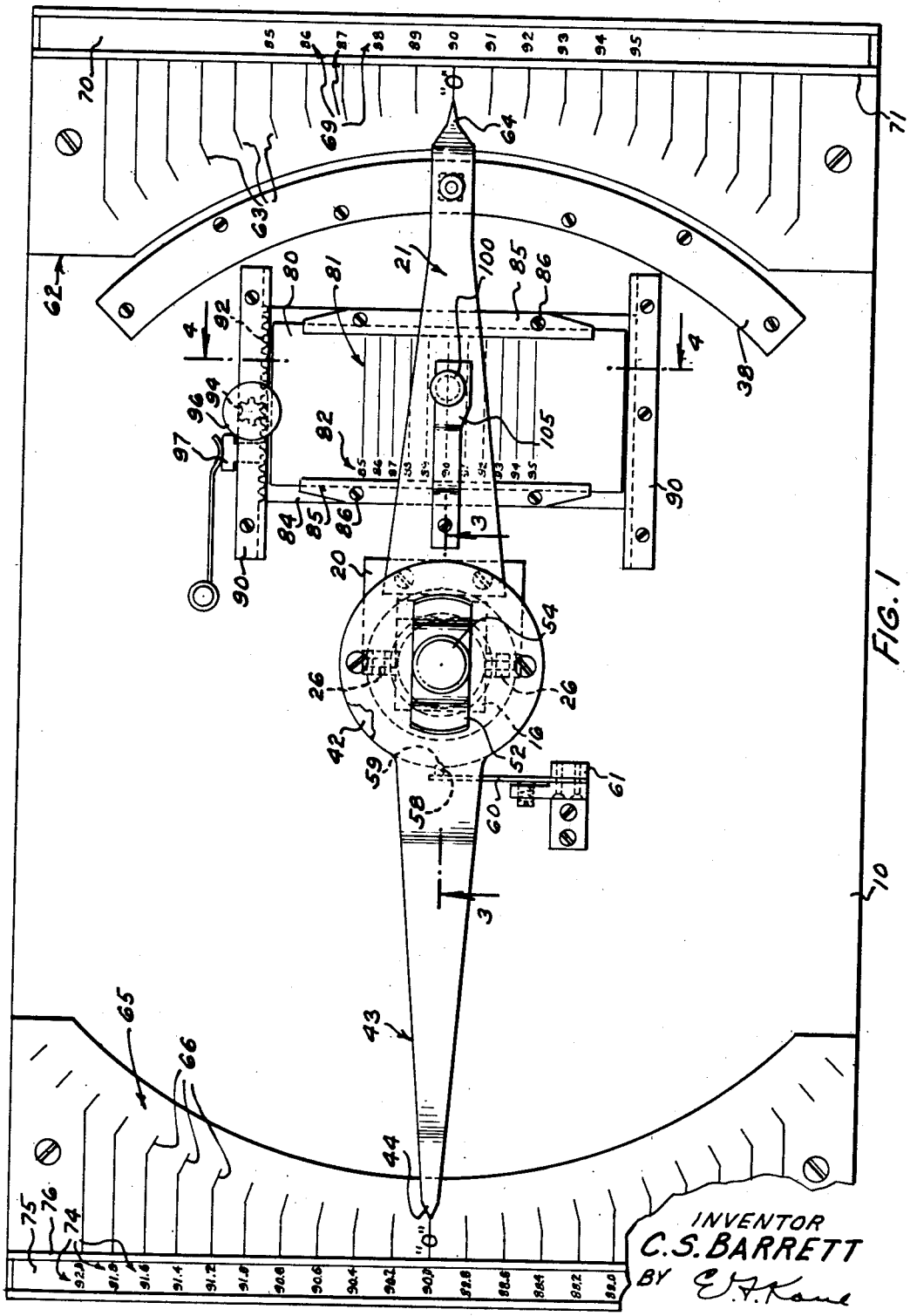

Referring to the drawings the device comprises a rectangular base plate 10 on the center of which is mounted a vertical cylindrical post 12 which has a base flange 13 secured to the base plate 10 by a plurality of cap screws 14. A sleeve or apertured block 16 is rotatably mounted on the post 12 with the lower end thereof in engagement with the base flange 13. A pair of trunnions or pins 18 secured to the sleeve 16 engage in apertures in the forward bifurcated ends 20 of a lever 21 for pivotally supporting the lever for vertical oscillation about the pins 18. For convenience in manufacture, the lever 21 is made from several parts secured together as indicated in the drawings. Arms 24 extend upwardly from the ends 20 of the lever 21 and have rollers 25 mounted in the upper ends thereof which normally engage in shallow recesses or grooves 26 formed in the underneath side of a disk 27. The disk 27 has a central bore for slidably receiving the post 12 and is secured by screws 30 to the outer ends of a pair of diametrically opposed leaf springs 31. The leaf springs 31 which are pre-formed into L shape are secured at their lower ends by screws 32 to the sleeve 16 and serve to support the disk 27 in the position shown in Fig. 2 and also permit a limited vertical movement of the disk 27 upwardly from its normal position. The springs 31, while permitting upward movement of the disk 27, are pre-formed to return the disk 27 to its normal position shown in Fig. 2 and thereby maintain the lever 21 in an elevated substantially horizontal position as shown in Fig. 2.

The lever 21 has a handle 35 by means of which the lever 21 may be manipulated and oscillated horizontally about the vertical axis of the post 12 or moved downwardly to a down position in which position a roller 36 mounted on a bracket 37 carried by the lever 21 engages a rail 38 on the base plate 10 to limit the downward movement of the lever 21. Thus the lever 21 is movable to and from its normal elevation or up position, and a down position, and is oscillatable horizontally from a normal "0" position as shown in Fig. 1 in opposite directions in either of the up or down positions.

In response to the downward movement of the lever 21 the disk 27 is moved upwardly into engagement with a disk 42 which is provided with a bore and is mounted for oscillatory movement on the upper reduced end of the post 12. The disk 42 is secured to and forms a part of an arm or pointer 43, a portion of which slopes downwardly and terminates in a point 44 adjacent the base 10. The disks 27 and 42 are each faced with flat annular rings or washers 46 and 47, respectively, of friction material which are normally spaced apart when the lever is in its up position and which are brought into contact with each other for establishing a driving connection between the disks and the lever 21 and the pointer 43, when the lever 21 is depressed to its down position. A washer of friction material 49 is secured to the disk 42 in a recess on the underneath surface thereof for engagement with a metal washer 50 secured on the post 12 in engagement with a shoulder formed thereon.

A leaf spring 52 which is clamped to the upper end of the post 12 by a thumb nut 54 has end portions 55 engageable with the pointer 43 for yieldably urging the pointer and the disk 42 downwardly and causing the friction washer 49 to engage the metal washer 50 and frictionally and yieldably retain the pointer 43 in a set position when the disk 27 is disengaged from the disk 42. It will thus be seen that when the lever 21 is depressed, a driving connection is established with the pointer 43, and as the lever 21 is angularly moved about the post 12 while in the depressed or lower position the pointer 43 will move with the lever 21 through a corresponding arcuate distance, and when the lever 21 is released and returned to its normal up position the driving connection between the lever 21 and the pointer 43 is broken and the lever 21 may be moved horizontally to its original, normal "0" position, leaving the pointer 43 in its previously set position.

A detent 58 engageable in a notch 59 in the periphery of the disk 27 serves to yieldably retain the lever 21 in its "0" position. The detent 58 is mounted on one end of the flat spring 60 which is supported at its opposite end in a bracket 61 mounted on the base plate 10.

A scale 62 having division marks or calibrations 63 thereon is provided for cooperation with the pointed end 64 of the lever 21, and a scale 65 having division marks or calibrations 66 thereon is provided for cooperation with the pointed end 44 of the pointer 43.

Numbers or unit markings 69 associated with the individual division marks on the scale 62 are printed or otherwise marked on a numerical scale designation strip 70 which is removably mounted in a channel-shaped retainer or holder 71 secured to the base plate 10. In like manner the numbers or unit markings 74 associated with the division marks of the scale 65 are printed on a numerical scale designation strip 75 which is removably secured in a holder 76 on the opposite end of the base plate 10. The scale strips 70 and 75 may be removed and replaced by other scale strips having different series of numbers thereon covering a different range of numerical values and adapted for use in determining various series of numbers in which the number of the components of the series may vary.

The length of the lever 21 may vary relative to the length of the pointer 43 and the spacing between the division marks 63 and 66 on the scales 62 and 65, respectively, may vary proportionately to the lengths of the lever and pointer. As disclosed herein the length of the lever 21 is substantially the same as that of the pointer 43 and the spacing of the division marks 63 on the scale 62 are the same as that of the division lines 66 of the scale 65.

As disclosed herein for purposes of illustration, the numbers on the scale number strips 75 are correlated to the numbers on the scale number strip 70 to indicate the average of a series of five numerical values entered into the device in which the nominal numerical value is 90 and the number 90 on each scale number strip is positioned opposite the "0" division marks on the scales 65 and 62. The ratio of the spacing of similar numbers on the strips 75 and 70 varies according to the number of observations or numerical values in the series to be averaged. Thus, in the example disclosed herein the spacing between the numerals 90 and 91 on the strip 75 is five times as great as the spacing between the numbers 90 and 91 on the strip 70. Accordingly, if a series of ten numbers were to be entered in the device to determine the average thereof, the ratio of the spacing between similar numerals on the strips 75 and 70 would be 10 to 1.

Mechanism is provided to graphically indicate the number and the magnitude of the individual numbers of a series entered in the device. Replaceable charts or cards 80 having printed thereon a series of parallel lines 81 and numbers 82 corresponding to the numbers 69 on the strip 70 are removably secured on a carrier plate 84 by a pair of flat spring clips 85 which in turn are secured on opposite margins of the plate 84 by screws 86. The plate 84 is disposed beneath the intermediate portion of the lever 21 and is guided for movement on the base plate 10 between a pair of guide rails 90—90 which engage the opposite ends of the plate and form guide channels therefor. Gear teeth 92 formed on one edge of the plate 84 engage the teeth of a spur gear 94 which is mounted on the base plate 10 and the guide rail 90 for rotation about a fixed axis and has a knob or hand wheel 96 for turning the gear and advancing and retracting the carrier plate 84. A detent 97 slidably mounted in an aperture in the guide rail 90 engages the teeth 92 of the plate 84 to retain the plate in adjusted position.

A pen or pencil 100 is removably mounted on the lever 21 and has a marking end 102 extending downwardly from the lever in spaced relation to the card 80 and in alignment with the intermediate line 81 thereof extending from the number 90 on the card. The pen 100 is slidably mounted in a sleeve 104 on the lever 21 and is retained in position on the lever by a flat spring member 105 bearing against the shoulder 106 on the pen 100 and urging the shoulder against the sleeve 104. When the lever 21 is depressed to its lower position to establish a driving connection with the pointer 43, the end 102 of the pen 100 engages the card 80, and as the lever 21 is moved horizontally in its depressed position during the entering of one of the series of numbers, the pen will draw an arcuate line indicating the extent of movement of the lever 21 and the number which was entered. After the lever 21 has been elevated to its normal raised position and moved horizontally to its "0" position, the detent 97 is retracted and the knob 96 turned to advance the carrier plate 84 and the chart card 80 thereon relative to the pen 100 preparatory to the entering of another number of the series.

In the operation of the device if we assume that we have a series of five values, having a numerical relationship to each other represented by the numbers 91, 93, 88, 92, and 89 which are obtained as the result of test inspection measurements of five articles, the nominal or desired value of each of which article should be 90, scale designation strips 70 and 75 having the nominal numeral 90 and the proper correlated scale numerals 69 and 74 thereon are inserted in the holders 71 and 76 with the numerals 90 positioned opposite the central or "0" division marks 66 and 71 on the scales. The operator may then enter the first of the numbers, namely 91, by engaging the handle 35 of the lever 21 and depressing the lever to its lower position and moving the lever clockwise from its "0" position in register with the nominal or desired number 90 to the division marking 91 which will cause the pointer 43 to be moved a corresponding arcuate distance to the line 90.2 after which the lever 21 is raised to its normal elevation and then moved counter-clockwise to its "0" position, leaving the pointer 43 in register with the line 90.2. The next number 93 is entered in a similar manner by first depressing the lever 21 which establishes a driving connection with the pointer 43, then moving the lever 21 clockwise to the numeral 93 on the scale 70 which is a displacement of three subdivisions on the scale 65 and which moves the pointer 43 two subdivisions in a clockwise direction in alignment with the subdivision line opposite the numeral 90.8. The number 88 is then entered by depressing the lever 21 and moving it in a counter-clockwise direction two subdivisions on the scale 65 from the "0" position to the numeral 88 which will cause the pointer 43 to move two subdivisions in a counter-clockwise direction and align the pointer 43 with the numeral 90.4 after which the lever is raised and returned to the "0" position. The numeral 92 is then entered by depressing the lever 21 and displacing it two subdivisions in a clockwise direction, causing a movement of the pointer through two subdivisions to the line opposite the numeral 90.8, after which the lever is returned to its upper elevation and to its "0" position. The final number 89 is then entered by depressing the lever 21 and moving it in a counter-clockwise direction to the line opposite the numeral 89 which imparts a corresponding displacement of the pointer 43 through one subdivision in a counter-clockwise direction to the line opposite the numeral 90.6. Thus, at the end of the operation of entering the five numerals the pointer 43 registers with the line opposite the numeral 90.6, which is the average of the series of numbers.

It will be understood that when it is desired to have a graphical representation of the number and the magnitude of the numerical values entered in the device, that a chart card 80 is applied to the carrier 84 and is held thereon by the springs 85 prior to the entering of the series of numbers. As each number is entered in the machine a curved line 109 will be drawn on the chart card 80, and in order to displace the lines 109 from each other the detent 97 is withdrawn and the handle 96 turned to advance the card a predetermined distance as successive ones of the numerical values are entered. Thus, in Fig. 5 there is shown on the chart card 80 a series of curved lines 109 indicating the number and magnitude of the entries made. This readily permits the determination of the range of the series of numbers entered.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A device for determining the average of a series of numerical values comprising a base, a lever arm, a pointer arm, means mounting said arms on said base for independent oscillatory movement about a vertical axis, scales associated with the ends of said lever and pointer arms, means mounting said lever for vertical movement to and from a normal inoperative position and an operative position, means yieldably maintaining said lever arm in said normal inoperative position in which position said lever arm is independently oscillatable about said vertical axis, and means for connecting the arms for oscillatable movement together about said vertical axis in response to vertical movement of said lever arm to its operative position.

2. A device for determining the average of a series of numerical values comprising a base, a lever arm, a pointer arm, means mounting said arms on said base for independent oscillatory movement about a vertical axis, scales associated with the ends of said lever and pointer arms, means mounting said lever for vertical movement to and from a normal inoperative position and an operative position, means yieldably maintaining said lever arm in said normal inoperative position in which position said lever arm is independently oscillatable about said vertical axis, means for connecting the arms for oscillatable movement together about said vertical axis in response to vertical movement of said lever arm to its operative position, means for holding a card on said base under a portion of said lever arm, a marking member mounted on said lever arm engageable with said card when said lever arm is moved to its operative position for marking lines thereon indicating the extent of angular movement of said lever, and means for moving said card on said base to space successive ones of said lines relative to each other.

3. A device for determining the average of a series of numerical values comprising a base, a lever arm, an indicator arm, means mounting said lever arm and said indicator arm on said base for independent oscillating movement about a vertical axis, scales associated with the ends of said lever and said indicator arms, means mounting said lever arm for vertical oscillatable movement about a horizontal axis adjacent to said vertical axis to and from a normal inoperative position and an operative position, means yieldably maintaining said lever arm in said normal inoperative position in which position said lever arm is independently oscillatable about said vertical axis, and means for establishing a driving connection between the arms for oscillatable movement together about said vertical axis in response to vertical movement of said actuator arm to its operative position.

4. A device for determining the average of a series of numerical values comprising a base, a lever arm, an indicator arm, means mounting said lever arm and said indicator arm on said base for independent oscillating movement about a vertical axis, scales associated with the ends of said lever and said indicator arms, means mounting said lever arm for vertical oscillatable movement about a horizontal axis adjacent to said vertical axis to and from a normal inoperative position and an operative position, means yieldably maintaining said lever arm in said normal inoperative position in which position said lever arm is independently oscillatable about said vertical axis, means for establishing a driving connection between the arms for oscillatable movement together about said vertical axis in response to vertical movement of said actuator arm to its operative position, means for holding a card on said base under a portion of said lever arm, a marking member mounted on said actuator arm engageable with said card when said actuator arm is moved to its operative position for marking lines thereon indicating the extent of angular movement of said lever arm, means for moving said card on said base into successive positions to space successive ones of said lines relative to each other, and means for releasably holding said card in said successive positions.

5. In a device for determining the average of a series of numerical values the combination of a base having a post thereon, a sleeve oscillatable on said post, a lever pivotally mounted on said sleeve for vertical movement to and from a normal inoperative position in spaced relation to said base and an operative position adjacent said base and for horizontal oscillatable movement with said sleeve about the axis of said post, a pointer having an apertured hub portion mounted on said post for oscillatable movement about the axis of said post, means for yieldably retaining said pointer against rotation, means oscillatable with said lever about the axis of said post and vertically movable into engagement with said pointer when said lever is moved into its operative position for establishing a driving connection between the lever and the pointer to oscillate said pointer with said lever when said lever is oscillated in its operative position, and scales on said base having correlated calibrations associated with the ends of said lever and said pointer.

6. A device of the character described comprising a base having a post thereon, a sleeve oscillatable on said post, a lever pivotally mounted on said sleeve for vertical oscillatable movement to and from a normal inoperative position and an operative position and for horizontal oscillatable movement with said sleeve about the axis of said post, a pointer having an apertured hub portion mounted on said post for oscillatable movement about the axis of said post, means for yieldably retaining said pointer in set position and against rotation, means oscillatable with said lever and operable in response to the movement thereof to said operative and inoperative positions for establishing and disestablishing a driving connection between said lever and said pointer for oscillatory movement together about the axis of said post, scales comprising spaced calibrations on said base associated with said lever and said pointer, numeral designation strips having a predetermined series of numbers arranged thereon in a predetermined pattern, holders for removably supporting said numeral designation strips on said base with the numerals thereon aligned with the calibrations on said scale, means on said lever for limiting the downward movement thereof and for guiding said lever for oscillatory movement about the axis of said post, a marking member, means for removably securing said marking member on said lever with the marking end of said member extending downwardly from the lever, a card holder, means on said base for guiding said card holder for movement under said lever and said marker, means for moving said card on said base into successive positions, and means for releasably holding said card holder in said successive positions.

7. A device for determining the average of a series of numbers comprising a base having a post thereon, a sleeve oscillatable on said post, a lever pivotally mounted on said sleeve for vertical oscillatable movement to and from a normal inoperative position in spaced relation to said base and an operative position adjacent said base and for horizontal oscillatable movement with said sleeve about the axis of said post, a pointer having an apertured hub portion mounted on said post for oscillatable movement about the axis of said post, means for yieldably retaining said pointer in set position and against rotation, an apertured disk mounted on said post adjacent the hub of said pointer, a spring means mounting said disk for oscillatory movement with said sleeve and for vertical movement into and out of engagement with the hub of said pointer, said springs serving to yieldably retain said disk in a normal position disengaged from said hub, and means on said lever operable in response to the movement of said lever into operative position for moving said disk into engagement with the hub of said pointer to establish a driving connection between said pointer and said lever for oscillatory movement together, scales comprising spaced calibrations on said base associated with said pointer and said lever, scale designation strips having predetermined numerals arranged thereon in a predetermined pattern, holders for removably supporting said scale designation strips on said base with the numerals thereon aligned in a predetermined order with the calibrations of said scales, means including a roller on said lever for limiting the downward movement thereof and for guiding said lever for oscillatory movement about said post, a marking member, means for removably securing said marking member on said lever with the marking end of said member extending downwardly from the lever, a card holder, means on said base for guiding said card holder for movement under said lever and said marker, means for moving said card holder on said base into successive positions, and means for releasably holding said card holder in said positions.

8. A device of the character described comprising a base having a post thereon, a sleeve oscillatable on said post, a pointer having an apertured hub oscillatable on said post, an apertured disk oscillatable on said post between said sleeve and said hub, spring means mounting said disk on said sleeve for oscillatory movement therewith and for vertical movement into and out of engagement with said hub, a bifurcated lever pivotally mounted intermediate its ends on said sleeve for oscillatable movement about a horizontal axis and for oscillatable movement with said sleeve on said post and with portions of the bifurcated end of the lever in engagement with said disk, said spring means serving to yieldably retain said disk in a normal raised position, said lever being movable vertically to an operative position adjacent said base to move the disk into engagement with the hub of said pointer to establish a driving connection between said lever and said pointer for angular movement on said post, and scales on said base associated with the ends of said lever and said pointer.

9. A device of the character described comprising a base having a post thereon, a sleeve oscillatable on said post, a pointer having an apertured hub oscillatable on said post, an apertured disk oscillatable on said post between said sleeve and said hub, spring means mounting said disk on said sleeve for oscillatory movement therewith and for vertical movement into and out of engagement with said hub, a bifurcated lever pivotally mounted intermediate its ends on said sleeve for oscillatable movement about a horizontal axis and for oscillatable movement with said sleeve and with portions of the bifurcated end of the lever in engagement with said disk, said spring means serving to yieldably retain said disk in a normal position disengaged from said hub and to maintain said lever in a normal raised inoperative position, said lever being movable downwardly to an operative position adjacent said base to effect the movement of the disk into engagement with the hub of said pointer to establish a driving connection between said lever and said pointer for angular movement about the axis of said post, scales on said base having correlated calibrations associated with the ends of said lever and said pointer, means including a roller on said lever for limiting the downward movement thereof and for guiding said lever for oscillatory movement about said post, a marking member, means for removably securing said marking member on said lever with the marking end of said member extending downwardly from the lever, a card holder, means on said base for guiding said card holder for movement under said lever and under said marker, means for moving said card on said base into successive positions, and means for releasably holding said card in said successive positions.

CLAUDIUS S. BARRETT.

References Cited in the file of this patent
UNITED STATES PATENTS

| Number | Name | Date |
|---|---|---|
| 7,961 | Nystron | Mar. 4, 1851 |
| 886,189 | Couch | Apr. 28, 1908 |
| 1,023,961 | Quivey | Apr. 23, 1912 |
| 1,387,551 | Meitner | Aug. 16, 1921 |
| 1,404,019 | Gilson | Jan. 17, 1922 |
| 1,748,783 | McGaughy | Feb. 25, 1930 |
| 2,377,977 | Spraberry | June 12, 1945 |